(12) United States Patent
Li et al.

(10) Patent No.: US 12,391,410 B2
(45) Date of Patent: Aug. 19, 2025

(54) MAGNETIC MULTI-POLE PROPULSION ARRAY SYSTEM

(71) Applicant: National Cheng Kung University, Tainan (TW)

(72) Inventors: Yueh-Heng Li, Tainan (TW); Yu-Ting Wu, Kaohsiung (TW); Chao-Wei Huang, Tainan (TW); Wei-Cheng Lo, Tainan (TW); Hsun-Chen Hsieh, Chiayi (TW); Ping-Han Huang, Tainan (TW); Yi-Long Huang, Changhua County (TW); Sheng-Wen Liu, Tainan (TW); Wei-Cheng Lien, Taichung (TW)

(73) Assignee: National Cheng Kung University, Tainan (TW)

( * ) Notice: Subject to any disclaimer, the term of this patent is extended or adjusted under 35 U.S.C. 154(b) by 359 days.

(21) Appl. No.: 18/084,519

(22) Filed: Dec. 19, 2022

(65) Prior Publication Data
US 2024/0124163 A1    Apr. 18, 2024

(30) Foreign Application Priority Data

Oct. 14, 2022 (TW) .................................. 111138974

(51) Int. Cl.
*B64G 1/40* (2006.01)
*H02N 11/00* (2006.01)

(52) U.S. Cl.
CPC ........... *B64G 1/409* (2013.01); *H02N 11/006* (2013.01)

(58) Field of Classification Search
CPC ..... B64G 1/409; H02N 11/006; F03H 1/0075; H05H 1/54

USPC ........................................................... 310/10
See application file for complete search history.

(56) References Cited

U.S. PATENT DOCUMENTS

| | | | | |
|---|---|---|---|---|
| 5,973,447 | A * | 10/1999 | Mahoney | H01J 27/143 313/363.1 |
| 6,031,334 | A * | 2/2000 | Meyer | F03H 1/0018 60/202 |
| 6,279,314 | B1 * | 8/2001 | Valentian | F03H 1/0075 60/202 |
| 7,030,576 | B2 * | 4/2006 | McVey | F03H 1/0075 315/501 |

(Continued)

FOREIGN PATENT DOCUMENTS

JP    2003-504545    2/2003

*Primary Examiner* — Ahmed Elnakib
(74) *Attorney, Agent, or Firm* — Winston Hsu

(57) ABSTRACT

A magnetic multi-pole propulsion array system is applied to at least one external cathode and includes a plurality of magnetic multi-pole thrusters connected adjacent to each other. Each magnetic multi-pole thruster includes a propellant provider, a discharge chamber, an anode and a plurality of magnetic components. The propellant provider outputs propellant. The discharge chamber is connected with the propellant provider to accommodate the propellant. The anode is disposed inside the discharge chamber to generate an electric field. The plurality of magnetic components is respectively disposed on several sides of the discharge chamber. One of the several sides of the discharge chamber of the magnetic multi-pole thruster is applied for one side of a discharge chamber of another magnetic multi-pole thruster.

10 Claims, 8 Drawing Sheets

(56) References Cited

U.S. PATENT DOCUMENTS

| | | | |
|---|---|---|---|
| 2005/0086926 A1* | 4/2005 | King | F03H 1/0075 60/202 |
| 2006/0186837 A1* | 8/2006 | Hruby | F03H 1/0075 315/501 |
| 2017/0284380 A1* | 10/2017 | Hofer | B64G 1/413 |
| 2019/0168895 A1* | 6/2019 | Conversano | F03H 1/0075 |
| 2024/0124163 A1* | 4/2024 | Li | H02N 11/006 |

* cited by examiner

MAGNETIC MULTI-POLE PROPULSION ARRAY SYSTEM

BACKGROUND OF THE INVENTION

1. Field of the Invention

The present invention relates to a propulsion array system, and more particularly, to a magnetic multi-pole propulsion array system with high thrust, low quality and long service life.

2. Description of the Prior Art

A plasma thruster is widely used in the propulsion system and attitude control system of the satellite due to property of high efficiency and low thrust. For precisely controlling the plasma, the conventional plasma thruster requires a lot of elements and therefore increases the quality and manufacturing cost of the propulsion system. The plasma thruster needs to operate for a long time to control the orbit of the satellite; if the plasma thruster is failed or has reached the service life, the satellite mission is failure or end. Conventional improvement technology may enlarge the size of the plasma thruster to increase the service life of the plasma thruster, but the magnetic field in the plasma thruster will be attenuated due to the enlarged size and strength of the magnetic field is insufficient and difficult to control plasma behavior. Thus, design of a thruster system with high thrust, low quality and long service life is an important issue in the related satellite industry.

SUMMARY OF THE INVENTION

The present invention provides a magnetic multi-pole propulsion array system with high thrust, low quality and long service life for solving above drawbacks.

According to the claimed invention, a magnetic multi-pole propulsion array system is applied to at least one external electron source. The magnetic multi-pole propulsion array system includes a plurality of magnetic multi-pole thrusters arranged adjacent to each other. Each magnetic multi-pole thruster includes a propellant provider, a discharge chamber, an anode and a plurality of magnetic components. The propellant provider is adapted to output propellant. The discharge chamber is connected with the propellant provider and adapted to accommodate the propellant. The anode is disposed inside the discharge chamber and adapted to generate an electric field. The plurality of magnetic components is respectively disposed on a plurality of sides of the discharge chamber. One of the plurality of sides of the discharge chamber of the magnetic multi-pole thruster is applied for one side of a discharge chamber of another magnetic multi-pole thruster.

According to the claimed invention, the magnetic multi-pole propulsion array system further comprises six magnetic multi-pole thrusters, the six magnetic multi-pole thrusters are connected adjacent to each other and surround the at least one external electron source. One of the plurality of magnetic components is disposed on a common side between two adjacent magnetic multi-pole thrusters of the plurality of magnetic multi-pole thrusters. Each magnetic component of the plurality of magnetic components comprises a first magnetic pole and a second magnetic pole, one magnetic component of the plurality of magnetic components is arranged in response to the first magnetic pole facing the discharge chamber, and another magnetic component adjacent to the foresaid one magnetic component of the plurality of magnetic components is arranged in response to the second magnetic pole facing the discharge chamber.

The magnetic multi-pole propulsion array system of the present invention can be applied for the propulsion system or the attitude control system of the satellite. The magnetic multi-pole propulsion array system can arrange the magnetic multi-pole thrusters adjacent to each other and surrounding the external electron source, and the scale of the thrust matrix can be enlarged or reduced in accordance with the design demand. The magnetic multi-pole thruster can be preferably designed as the magnetic six-pole thruster, which can provide the largest channel volume due to the array arrangement; an included angle of the adjacent magnetic components of the magnetic six-pole thruster is large and can provide the preferred magnetic field loop. A shape of the discharge chamber is not limited to the side number of the magnetic multi-pole thruster. Moreover, each magnetic multi-pole thruster can share some of the magnetic component and the related magnetic field loop with the adjacent magnetic multi-pole thruster, which can decrease the weight and manufacturing cost of the magnetic multi-pole propulsion array system, and further decrease satellite launch and orbit costs. Comparing to the prior art, the magnetic multi-pole propulsion array system of the present invention can still operate normally when some of the thrusters or the electron sources are damaged, so as to prolong the service life of the satellite and reduce the mission risk.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
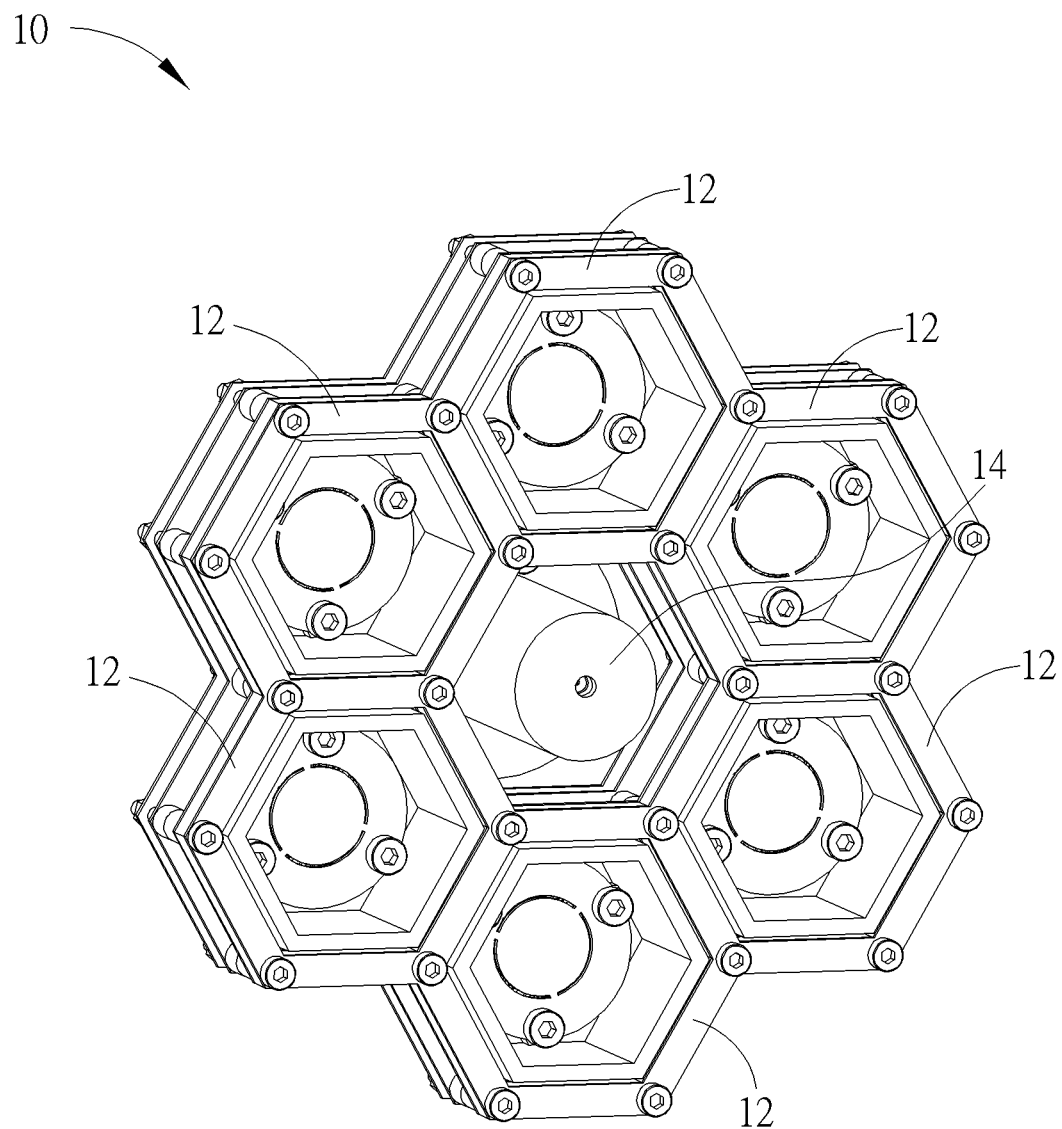
FIG. 1 and FIG. 2 are diagrams of a magnetic multi-pole propulsion array system in different types according to an embodiment of the present invention.
Figure 2:
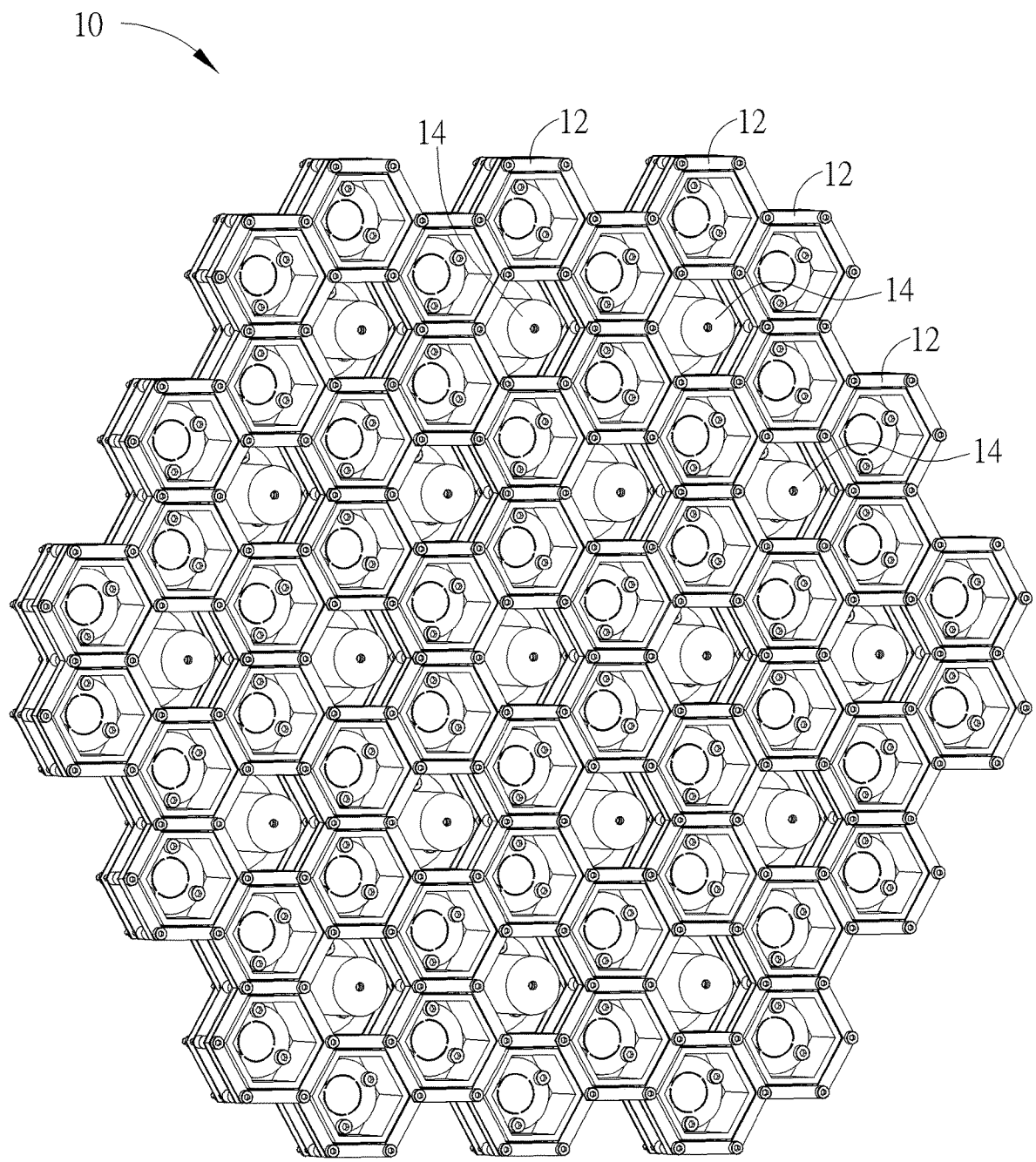

Please refer to FIG. 1 and FIG. 2. FIG. 1 and FIG. 2 are diagrams of a magnetic multi-pole propulsion array system 10 in different types according to an embodiment of the present invention. The magnetic multi-pole propulsion array system 10 can include a plurality of magnetic multi-pole thrusters 12 connected adjacent to each other. In one embodiment, the magnetic multi-pole thruster 12 can have six magnetic poles, and therefore a minimum scale of the magnetic multi-pole propulsion array system 10 includes six magnetic multi-pole thrusters 12 and is further matched with at least one external electron source 14, as shown in FIG. 1. The scale of the magnetic multi-pole propulsion array system 10 can be enlarged to apply for several external electron sources 14, and there are six magnetic multi-pole thrusters 12 surrounded around each external electron source 14, as shown in FIG. 2.

Besides, the magnetic multi-pole thruster 12 may optionally have other numbers of magnetic poles. For example, the magnetic multi-pole thruster 12 may have three magnetic poles, and the minimum scale of the magnetic multi-pole propulsion array system 10 can include three magnetic multi-pole thrusters 12 connected adjacent to each other and surrounding one external electron source 14; or, the magnetic multi-pole thruster 12 may have four magnetic poles, and the minimum scale of the magnetic multi-pole propulsion array system 10 can include four magnetic multi-pole thrusters 12 connected adjacent to each other and surrounding one external electron source 14. A number of the magnetic poles of the magnetic multi-pole thruster 12 and the minimum scale of the magnetic multi-pole propulsion array system 10 are not limited to the above-mentioned embodiment, and depend on a design demand.

Figure 3:
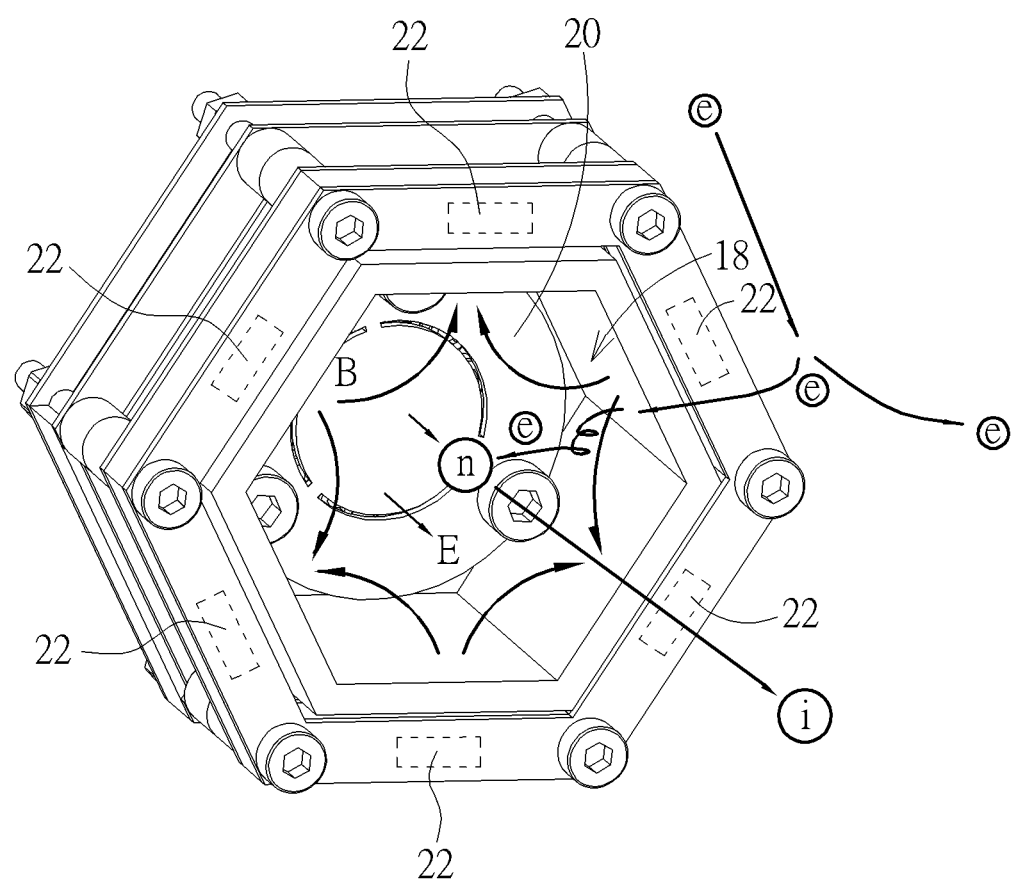
FIG. 3 is a diagram of a magnetic multi-pole thruster according to the embodiment of the present invention.
Figure 4:
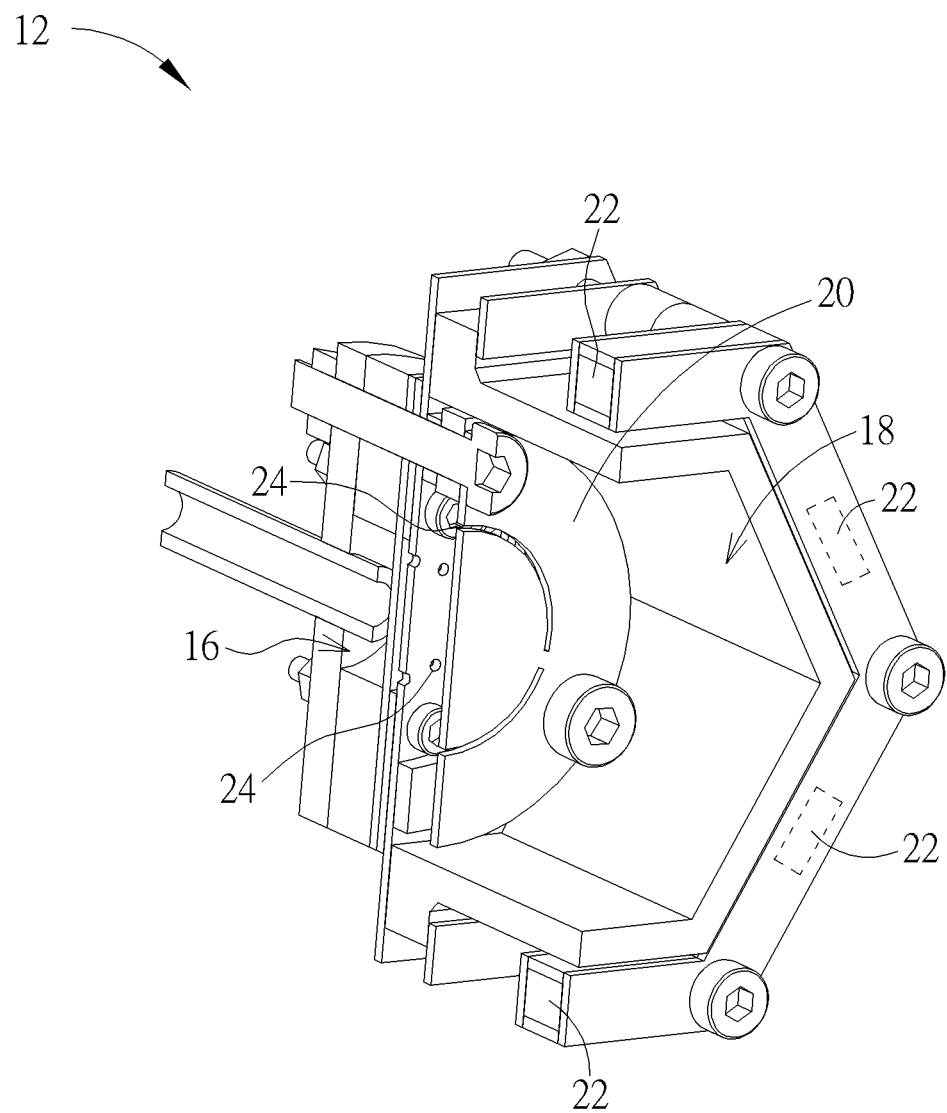
FIG. 4 is a sectional view of the magnetic multi-pole thruster according to the embodiment of the present invention.

Please refer to FIG. 1 to FIG. 4. FIG. 3 is a diagram of the magnetic multi-pole thruster 12 according to the embodiment of the present invention. FIG. 4 is a sectional view of the magnetic multi-pole thruster 12 according to the embodiment of the present invention. The magnetic multi-pole thruster 12 can include a propellant provider 16, a discharge chamber 18, a propulsion anode 20 and a magnetic component 22. The propellant provider 16 can be connected with the discharge chamber 18 and used to output propellant, and the propellant can pass through an ejection hole 24 to enter the discharge chamber 18. The discharge chamber 18 can accommodate the propellant from the propellant provider 16. The propellant is neutral gas atoms. The propulsion anode 20 can be disposed on a bottom inside the discharge chamber 18 and used to generate an electric field E. A field direction of the electric field E can be perpendicular to the propulsion anode 20 (or can be interpreted as the field direction is substantially parallel to a surface normal vector of the anode 20), and can further uniformly cover the whole discharge chamber 18. The electric field E shown in FIG. 3 is marked to show a direction instead of its covering range.

A number of the magnetic component 22 can correspond to a number of the magnetic multi-pole thruster 12 included by the minimum scale of the magnetic multi-pole propulsion array system 10. In one embodiment, the magnetic multi-pole thruster 12 can include six magnetic components 22 respectively disposed on six sides of the discharge chamber 18. As shown in FIG. 1 and FIG. 2, the discharge chambers 18 of the two adjacent magnetic multi-pole thrusters 12 can share the same side, and the magnetic component 22 which is disposed on the common side can provide the common magnetic field loop to the two adjacent magnetic multi-pole thrusters 12. Therefore, the magnetic multi-pole propulsion array system 10 of the present invention can utilize design of the common magnetic field to decrease an element number of the thrusters, so as to effectively decrease a weight of the magnetic multi-pole propulsion array system 10 and provide preferred durability.

Figure 5:
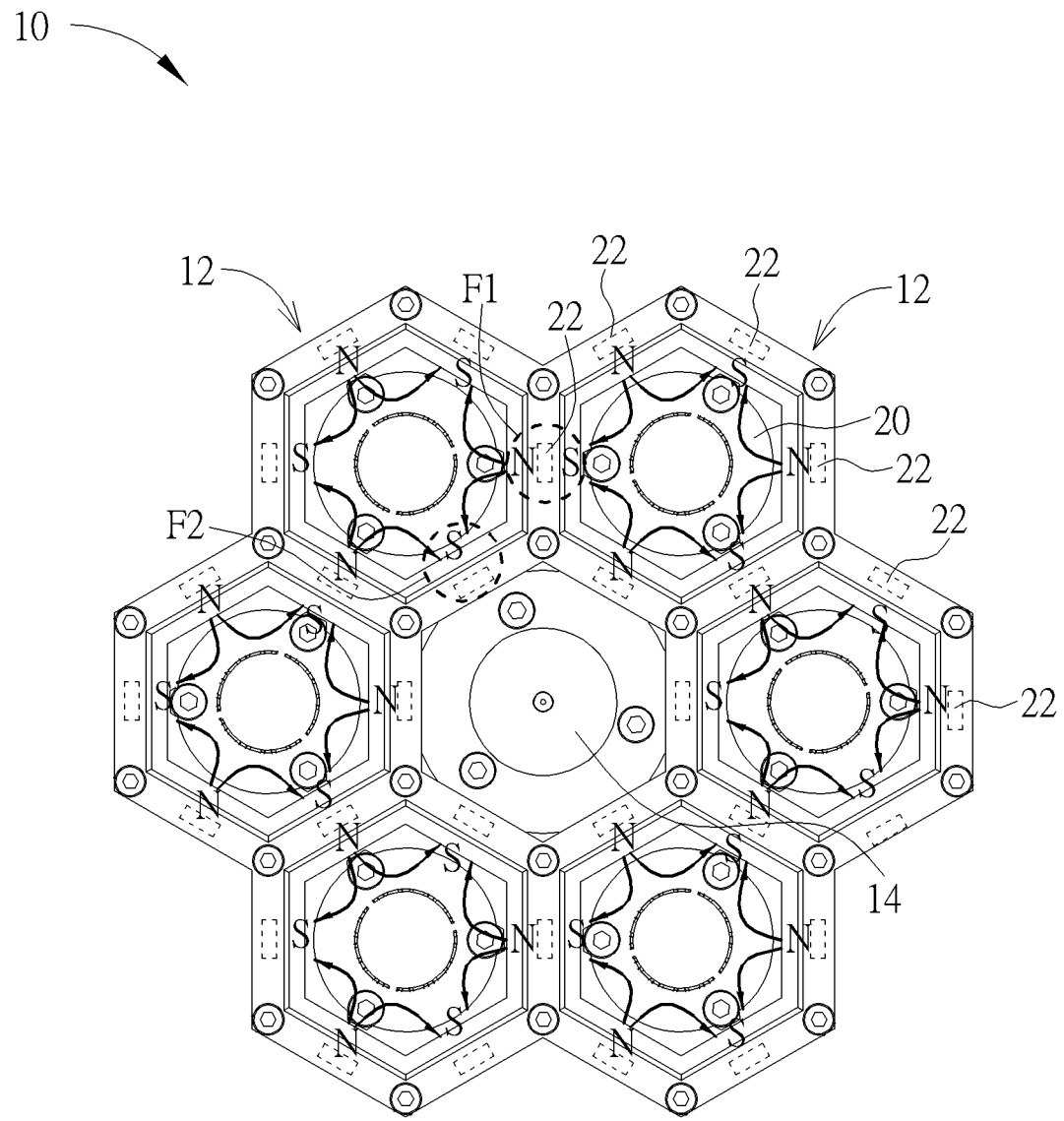
FIG. 5 is a diagram of the common magnetic field loop formed by magnetic pole arrangement of the magnetic multi-pole thrusters according to the embodiment of the present invention.

Please refer to FIG. 5. FIG. 5 is a diagram of the common magnetic field loop formed by magnetic pole arrangement of the magnetic multi-pole thrusters 12 according to the embodiment of the present invention. The magnetic component 22 which is disposed on the common side can have two magnetic poles respectively facing the two adjacent magnetic multi-pole thrusters 12, such as the magnetic component 22 marked by a dotted frame F1. The magnetic component 22 which is disposed on the non-common side can have two magnetic poles respectively facing the external electron source 14 and an orientation opposite to the external electron source 14, such as the magnetic component 22 marked by a dotted frame F2. Moreover, the present invention may optionally rotate the magnetic component 22 shown in FIG. 5 by ninety degrees to apply for other possible embodiment, which means the two magnetic poles of the magnetic component 22 disposed on the common side can respectively face two opposite ends of the common side; this embodiment is not shown in the figures.

The two magnetic poles of the magnetic component 22 can be defined as a first magnetic pole and a second magnetic pole, which respectively belong to the N pole and the S pole. As shown in FIG. 5, one magnetic component 22 of the six magnetic components 22 can be arranged by facing the first magnetic pole toward inner of the discharge chamber 18, and two magnetic components 22 adjacent to the foresaid one magnetic component 22 can be arranged by facing the second magnetic pole toward the inner of the discharge chamber 18; that is to say, the plurality of magnetic components 22 of the same magnetic multi-pole thruster 12 can be arranged in a manner of staggered magnetic poles, and the magnetic field loop B formed by the magnetic multi-pole thruster 12 can be substantially perpendicular to the electric field E and used to constrain electrons e provided by the external electron source 14 inside the discharge chamber 18. The electric field E can be substantially parallel to an electron ejection direction of the external electron source 14, so as to attract the electrons e provided by the external electron source 14 to move into the discharge chamber 18.

In the present invention, the magnetic component 22 can be a permanent magnet or an electromagnet. The magnetic component 22 made of the permanent magnet does not have extra power supply and has advantages of lightweight, and can maintain the predetermined magnetic field loop B for a long time. The magnetic component 22 made of the electromagnet can have the power supply and a detector (which is not shown in the figures); the detector can detect the electron ejection flow from the external electron source 14, and then change current intensity of the power supply to vary a magnetic field strength of the magnetic component 22 in accordance with a detection result, so as to have more possible applications.

Figure 6:
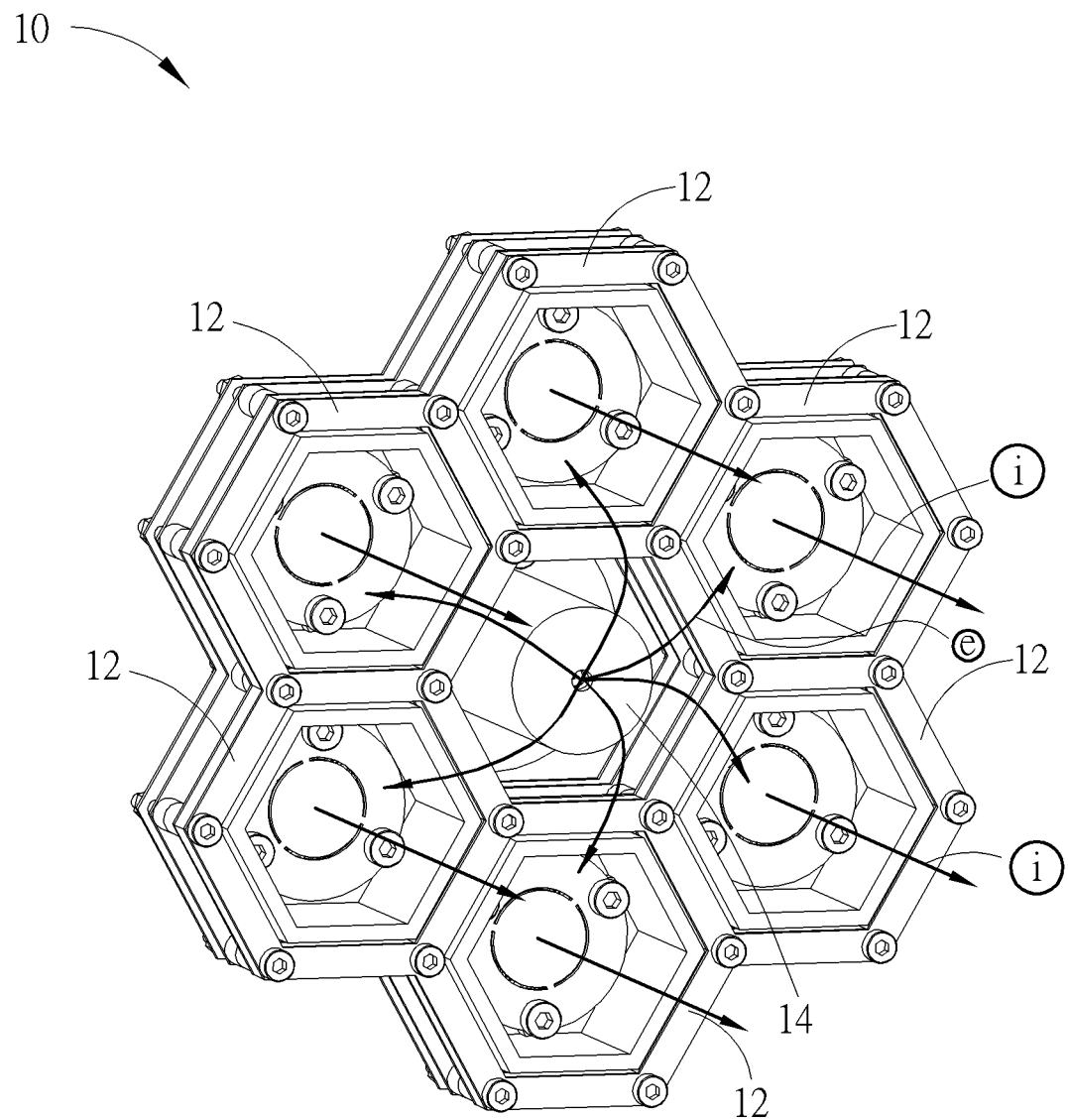
FIG. 6 is an action diagram of the magnetic multi-pole propulsion array system according to the embodiment of the present invention.

Please refer to FIG. 6. FIG. 6 is an action diagram of the magnetic multi-pole propulsion array system 10 according to the embodiment of the present invention. First, the propulsion anode 20 can be actuated to generate the electric field E, and the propellant provider 16 can be actuated simultaneously to eject the propellant into the discharge chamber 18. Then, the external electron source 14 can provide the electron ejection flow; in the meantime, the magnetic component 22 made of the permanent magnet can provide the stable magnetic field loop B, or the magnetic component 22 made of the electromagnet can provide the proper magnetic field loop B in accordance with the intensity of the electron ejection flow. The electrons e from the external electron source 14 can be affected by the electric field E and moved toward the inner of the discharge chamber 18, and further be constrained at a front part of the discharge chamber 18 by the magnetic field loop B. The electrons e in high speed can hit the neutral gas atoms n to generate the electrons e and the ions i. The electrons e can be constrained by the magnetic field loop B to extend the time staying inside the discharge chamber 18, so as to increase probability of the electron e hitting the neutral gas atom n to generate the ion i. The electric field E generated by the propulsion anode 20 and the electrons can be used to speed up ejection of the ions i for thrust of the magnetic multi-pole thruster 12; meanwhile, the external electron source 14 can neutralize the ions i exiting the magnetic multi-pole thruster 12 to maintain electrical neutrality of the whole system.

Figure 7:
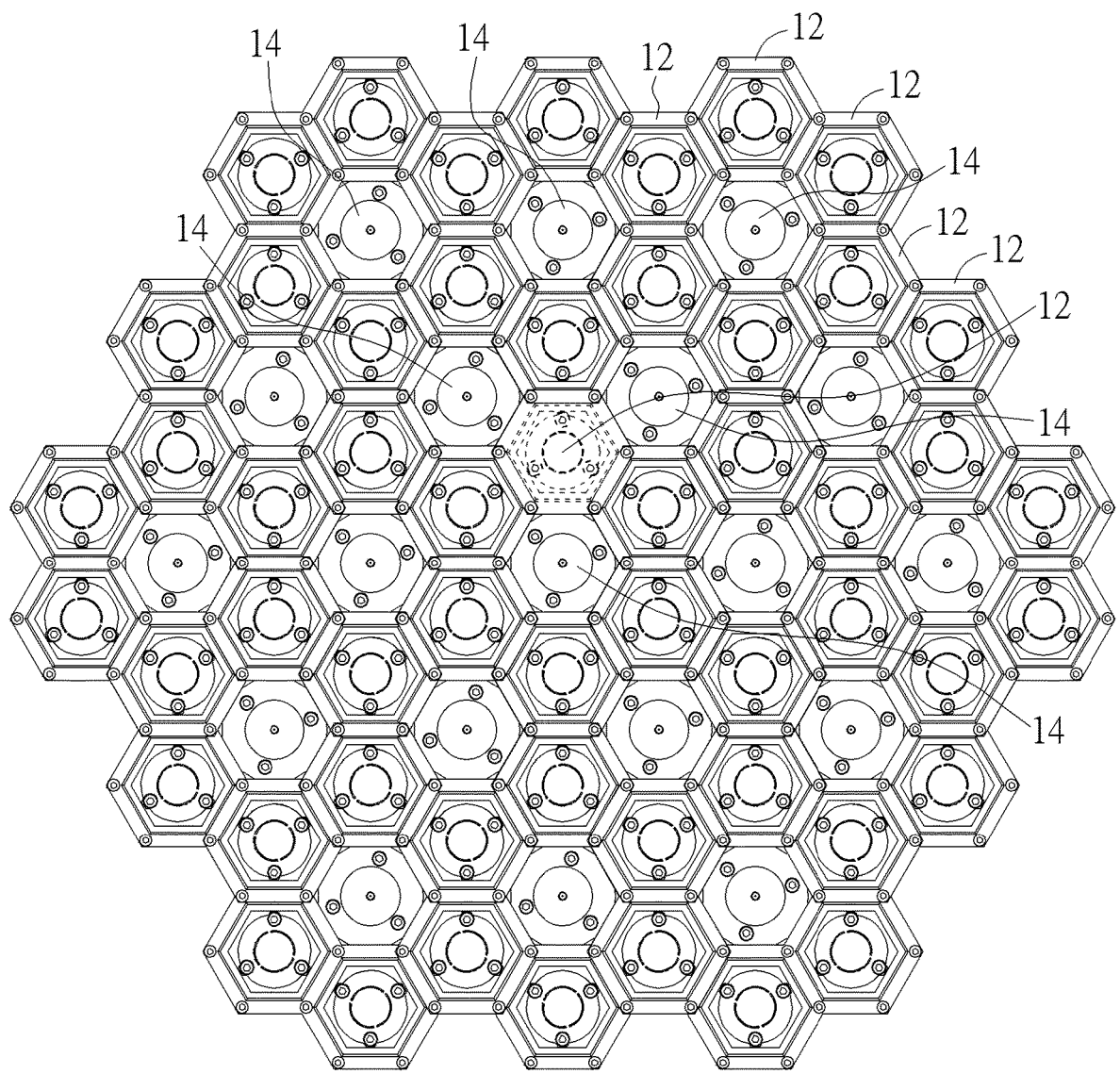
FIG. 7 and FIG. 8 are diagrams of the magnetic multi-pole propulsion array system in different operation states according to the embodiment of the present invention.
Figure 8:
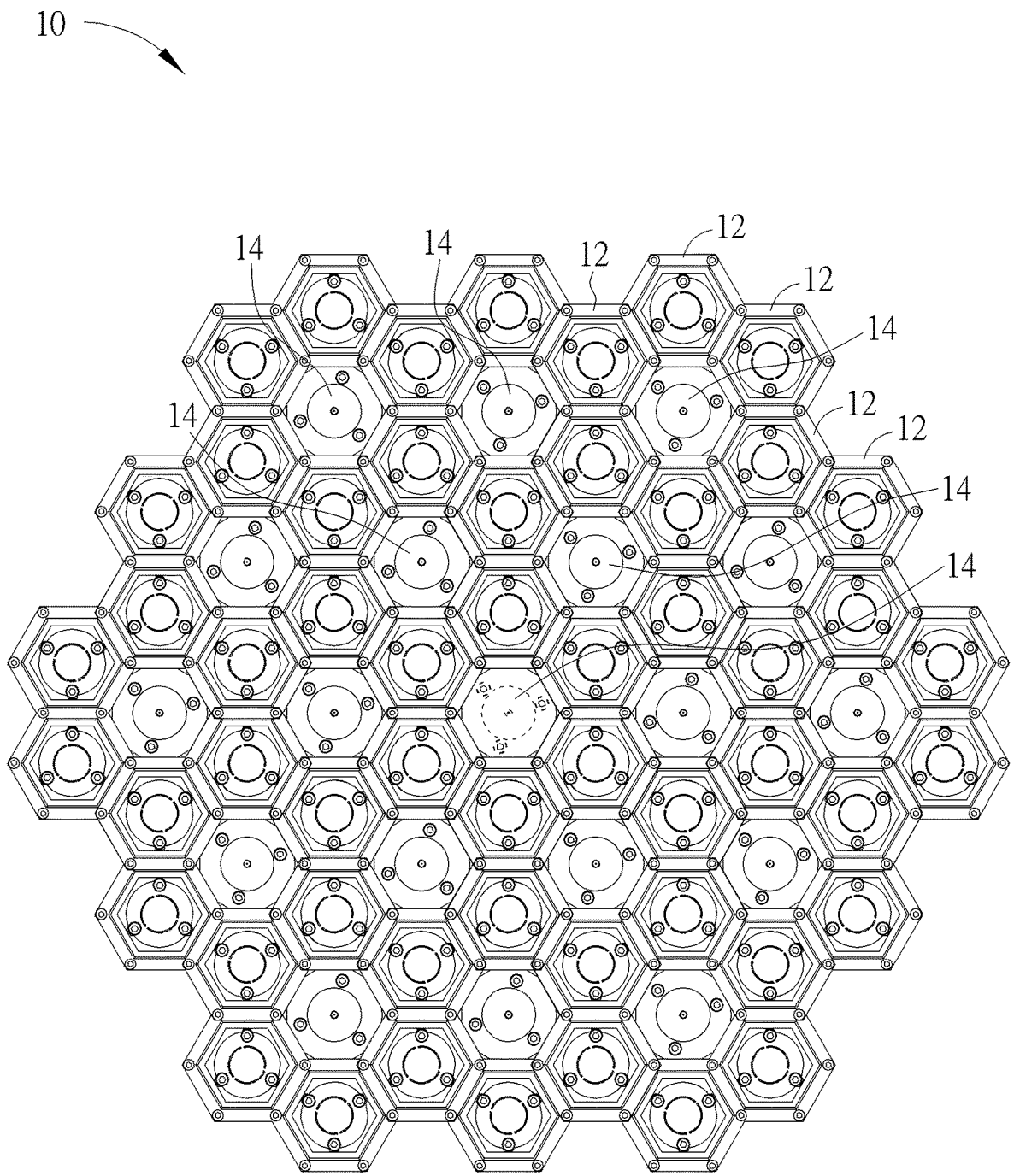

Please refer to FIG. 7 and FIG. 8. FIG. 7 and FIG. 8 are diagrams of the magnetic multi-pole propulsion array system 10 in different operation states according to the embodiment of the present invention. As shown in FIG. 7, if the magnetic multi-pole propulsion array system 10 has one or a less number of the magnetic multi-pole thruster 12 being failed, such as the magnetic multi-pole thruster 12 drawn in the dotted line, the magnetic multi-pole thrusters 12 around the failed magnetic multi-pole thrusters 12 can be still in a normally working state, and overall operation of the magnetic multi-pole propulsion array system 10 can be also in the normally working state. As shown in FIG. 8, the magnetic multi-pole propulsion array system 10 may have one or a less number of the external electron source 14 being failed, such as the external electron source 14 drawn in the dotted line; although the failed external electron source 14 cannot provide the electrons e, the magnetic multi-pole thruster 12 around the failed external electron source 14 can acquire the electrons e from other external electron source 14 in the normally working state, and the overall operation of the magnetic multi-pole propulsion array system 10 can be also in the normally working state.

In conclusion, the magnetic multi-pole propulsion array system of the present invention can be applied for the propulsion system or the attitude control system of the satellite. The magnetic multi-pole propulsion array system can arrange the magnetic multi-pole thrusters adjacent to each other and surrounding the external electron source, and the scale of the thrust matrix can be enlarged or reduced in accordance with the design demand. The magnetic multi-pole thruster can be preferably designed as the magnetic six-pole thruster, which can provide the largest channel volume due to the array arrangement; an included angle of the adjacent magnetic components of the magnetic six-pole thruster is large and can provide the preferred magnetic field loop. A shape of the discharge chamber is not limited to the side number of the magnetic multi-pole thruster. Moreover, each magnetic multi-pole thruster can share some of the magnetic component and the related magnetic field loop with the adjacent magnetic multi-pole thruster, which can decrease the weight and manufacturing cost of the magnetic multi-pole propulsion array system, and further decrease satellite launch and orbit costs. Comparing to the prior art, the magnetic multi-pole propulsion array system of the present invention can still operate normally when some of the thrusters or the electron sources are damaged, so as to prolong the service life of the satellite and reduce the mission risk.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic multi-pole propulsion array system applied to at least one external electron source, the magnetic multi-pole propulsion array system comprising:

a plurality of magnetic multi-pole thrusters connected adjacent to each other and surrounding the at least one external electron source, each of the plurality of magnetic multi-pole thrusters comprising:
a propellant provider adapted to output propellant;
a discharge chamber connected with the propellant provider and adapted to accommodate the propellant;
an anode disposed inside the discharge chamber and adapted to generate an electric field; and
a plurality of magnetic components respectively disposed on a plurality of sides of the discharge chamber, one of the plurality of sides of the discharge chamber of the magnetic multi-pole thruster being applied for one side of a discharge chamber of another magnetic multi-pole thruster.

2. The magnetic multi-pole propulsion array system of claim 1, wherein the magnetic multi-pole propulsion array system further comprises six magnetic multi-pole thrusters.

3. The magnetic multi-pole propulsion array system of claim 1, wherein one of the plurality of magnetic components is disposed on a common side between two adjacent magnetic multi-pole thrusters of the plurality of magnetic multi-pole thrusters.

4. The magnetic multi-pole propulsion array system of claim 3, wherein two magnetic poles of the magnetic component respectively face the two adjacent magnetic multi-pole thrusters.

5. The magnetic multi-pole propulsion array system of claim 3, wherein two magnetic poles of the magnetic component respectively face the at least one external electron source and an orientation opposite to the at least one external electron source.

6. The magnetic multi-pole propulsion array system of claim 3, wherein two magnetic poles of the magnetic component respectively face two opposite ends of the common side.

7. The magnetic multi-pole propulsion array system of claim 1, wherein each magnetic component of the plurality of magnetic components comprises a first magnetic pole and a second magnetic pole, one magnetic component of the plurality of magnetic components is arranged in response to the first magnetic pole facing the discharge chamber, and another magnetic component adjacent to the foresaid one magnetic component of the plurality of magnetic components is arranged in response to the second magnetic pole facing the discharge chamber.

8. The magnetic multi-pole propulsion array system of claim 1, wherein electrons provided by the at least one external electron source is constrained inside the discharge chamber via a magnetic field loop formed by the plurality of magnetic components.

9. The magnetic multi-pole propulsion array system of claim 1, wherein a field direction of the electric field generated by the anode is substantially parallel to an electron ejection direction of the at least one external electron source, so as to attract electrons provided by the at least one external electron source to move into the discharge chamber.

10. The magnetic multi-pole propulsion array system of claim 1, wherein any magnetic component of the plurality of magnetic components is a permanent magnet or an electromagnet, a magnetic field strength of the electromagnet is varied in accordance with an electron ejection flow from the at least one external electron source.

* * * * *